United States Patent
Kim et al.

(10) Patent No.: US 12,375,950 B2
(45) Date of Patent: Jul. 29, 2025

(54) METHOD AND APPARATUS FOR SUPPORTING SERVICE CONTINUITY POLICY CONTROL

(71) Applicant: SAMSUNG ELECTRONICS CO., LTD., Suwon-si (KR)

(72) Inventors: Hyesung Kim, Suwon-si (KR); Sungjin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 403 days.

(21) Appl. No.: 18/053,633

(22) Filed: Nov. 8, 2022

(65) Prior Publication Data

US 2023/0144174 A1 May 11, 2023

(30) Foreign Application Priority Data

Nov. 9, 2021 (KR) .................. 10-2021-0153170

(51) Int. Cl.
*H04W 24/04* (2009.01)
*H04W 4/50* (2018.01)
*H04W 60/00* (2009.01)

(52) U.S. Cl.
CPC ............. *H04W 24/04* (2013.01); *H04W 4/50* (2018.02); *H04W 60/00* (2013.01)

(58) Field of Classification Search
CPC ........ H04W 24/04; H04W 4/50; H04W 60/00
USPC ..................................................... 455/435.1
See application file for complete search history.

(56) References Cited

U.S. PATENT DOCUMENTS

2021/0058489 A1  2/2021  Kim et al.

OTHER PUBLICATIONS

Supplementary European Search Report dated Oct. 17, 2024, in connection with European Patent Application No. 22893176.2, 10 pages.
3GPP TR 23.700-98 V0.7.1 (May 2022) Technical Report; 3rd Generation Partnership Project; Technical Specification Group Services and System Aspects; Study on Enhanced architecture for enabling Edge Applications; (Release 18); 142 pages.
Samsung, "Remove ENs in solution #12," 3GPP TSG-SA WG6 Meeting #49-bis-e, S6-221581 (revision of S6-22xxxx), e-meeting, Jun. 22-Jul. 1, 2022, 2 pages.
International Search Report and Written Opinion of the International Searching Authority dated Jan. 31, 2023, in connection with International Application No. PCT/KR2022/017523, 8 pages.
Samsung, "Terms and abbreviations for service continuity," S6-210496, 3GPP TSG-SA WG6 Meeting #42-e, Mar. 1-9, 2021, 30 pages.
Samsung, "EEC context relocation," S6-212090, 3GPP TSG-SA WG6 Meeting #45-e, Aug. 25-Sep. 3, 2021, 24 pages.
Ericsson, "E3 exposure context transfer," S6-211205, 3GPP TSG-SA WG6 Meeting #43-e, May 24-Jun. 2, 2021, 7 pages.

(Continued)

*Primary Examiner* — Mark G. Pannell

(57) ABSTRACT

A method performed by a first entity corresponding to an edge enabler client (EEC) in an edge computing system is provided. The method includes transmitting, to a second entity corresponding to an edge enabler server (EES), a registration request message; and receiving, from the second entity, a registration response message, wherein the registration request message includes capability information to perform service continuity planning, and wherein the registration response message includes information on allowing the service continuity planning of the first entity.

15 Claims, 8 Drawing Sheets

(56) References Cited

OTHER PUBLICATIONS

"MEC for Automotive in Multi-Operator Scenarios", 5GAA AutomotiveAssociation, Technical Report, Mar. 3, 2021, 58 pages.

3GPP TR 23.700-98 V0.3.0 (Oct. 2021) Technical Report; 3rd Generation Partnership Project; Technical Specification Group Services and System Aspects; Study on Enhanced architecture for enabling Edge Applications; (Release 18); 41 pages.

3GPP TS 23.558 V17.1.0 (Sep. 2021) Technical Specification; 3rd Generation Partnership Project; Technical Specification Group Services and System Aspects; Architecture for enabling Edge Applications; (Release 17); 162 pages.

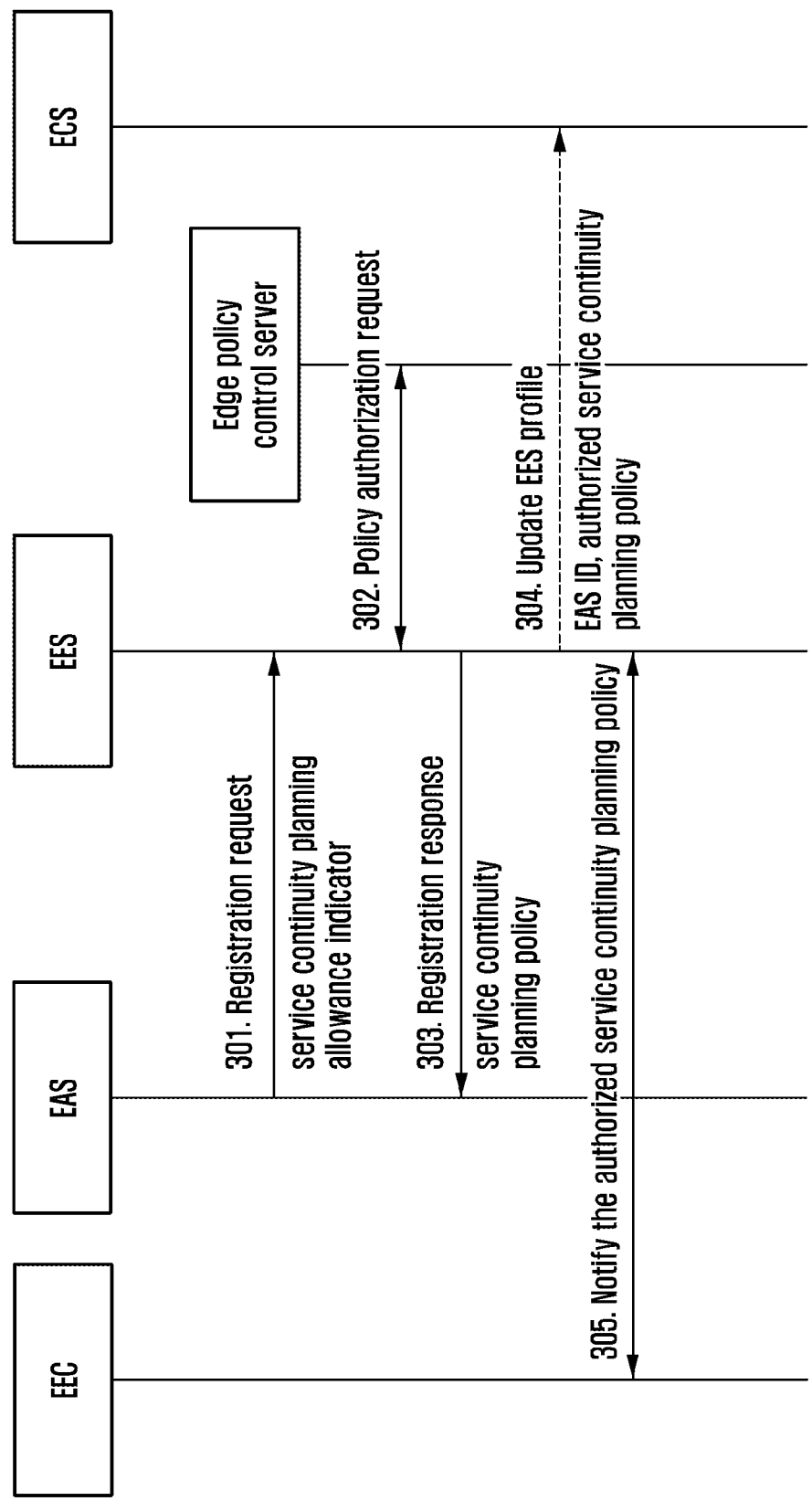

METHOD AND APPARATUS FOR SUPPORTING SERVICE CONTINUITY POLICY CONTROL

CROSS-REFERENCE TO RELATED APPLICATION

This application is based on and claims priority under 35 U.S.C. § 119 to Korean Patent Application No. 10-2021-0153170, filed on Nov. 9, 2021, in the Korean Intellectual Property Office, the disclosure of which is herein incorporated by reference in its entirety.

BACKGROUND

1. Field

The disclosure relates to a method and apparatus for controlling a policy related to supporting continuity of an edge computing service.

2. Description of Related Art

Considering the development of wireless communication from generation to generation, the technologies have been developed mainly for services targeting humans, such as voice calls, multimedia services, and data services. Following the commercialization of 5th-generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality classes, virtual reality headsets, and hologram devices. In order to provide various services by connecting hundreds of billions of devices and things in the 6G era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-hand signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network.

In addition, through designing new protocols to be used in 6G communication systems, developing mechanism for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

SUMMARY

For continuity of an edge computing service, searching for an edge application server that a user equipment (UE) is expected to access in the future is performed based on UE mobility-based prediction, and application context information may be transmitted preemptively. According to the prediction-based context information relocation scheme, an edge application server from which a UE currently receives a service transmits application context information in advance to a neighboring edge application server, and thus the neighboring edge application server may allocate related resources in advance. In this instance, in the case that a wrong prediction is made in association with a movement of the UE, a corresponding resource may be wasted. Alternatively, in the case that the UE induces transmission of app context information to all neighboring edge application servers in advance, the waste of resources may excessively occur. Therefore, there is a desire for a method and apparatus for controlling transmission of prediction-based application context information.

The disclosure provides a method and apparatus for controlling transmission of prediction-based application context information.

According to an aspect of the disclosure, a method performed by a first entity corresponding to an edge enabler client (EEC) in an edge computing system includes transmitting, to a second entity corresponding to an edge enabler server (EES), a registration request message; and receiving, from the second entity, a registration response message, wherein the registration request message includes capability information to perform service continuity planning, and wherein the registration response message includes information on allowing the service continuity planning of the first entity.

According to another aspect of the disclosure, a method performed by a second entity corresponding to edge enabler server (EES) in an edge computing system includes receiving, from a first entity corresponding to an edge enabler client (EEC), a registration request message, wherein the registration request message includes capability information to perform service continuity planning; determining whether to allow the service continuity planning of the first entity; and transmitting, to the first entity, a registration response message, wherein in case that the second entity determines to allow the service continuity planning of the first entity, the registration response message includes information on allowing the service continuity planning of the first entity.

According to another aspect of the disclosure, a first entity corresponding to an edge enabler client (EEC) in an edge computing system includes a transceiver; and a controller configured to transmit, via the transceiver to a second entity corresponding to an edge enabler server (EES), a registration request message, and receive, via the transceiver from the second entity, a registration response message, wherein the registration request message includes capability information to perform service continuity planning, and wherein the registration response message includes information on allowing the service continuity planning of the first entity.

According to another aspect of the disclosure, a second entity corresponding to an edge enabler server (EES) in an edge computing system includes a transceiver; and a controller configured to: receive, via the transceiver from a first entity corresponding to an edge enabler client (EEC), a registration request message, wherein the registration request message includes capability information to perform service continuity planning, determine whether to allow the service continuity planning of the first entity, and transmit, via the transceiver to the first entity, a registration response message, wherein in case that the second entity determines to allow the service continuity planning of the first entity, the registration response message includes information on allowing the service continuity planning of the first entity.

The technical problems to be achieved in the embodiment of the disclosure are not limited to the technical problems mentioned above, and other technical problems not mentioned herein will be clearly understood from the following description by those skilled in the art to which the disclosure belongs.

According to an embodiment of the disclosure, prediction-based application context information may be transmitted by efficiently using resources.

Further, according to an embodiment of the disclosure, the EEC may report capability information related to performing of service continuity planning and the EES may determine whether to perform service continuity planning by the EEC, based on the capability information.

Further, according to an embodiment of the disclosure, application context information optimized for location of a terminal may be provided by predicting, tracking, or updating the location of the terminal.

Effects obtainable in the disclosure are not limited to the effects mentioned above, and other effects not mentioned may be clearly understood by those skilled in the art to which the disclosure belongs from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part there that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM)random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a re writable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 illustrates an example of an EAS request-based service continuity planning policy determining procedure according to an embodiment of the present disclosure;

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Furthermore, In the following description of the disclosure, a detailed description of known functions or configurations incorporated herein will be omitted when it is determined that the description may make the subject matter of the disclosure unnecessarily unclear.

In the disclosure, terms referring to network entities and entities of an edge computing system, terms referring to messages, terms referring to identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in 5G system standards for the convenience of description. However, the disclosure is not limited by these terms and names, and may be applied in the same way to systems that conform other standards.

Figure 1:
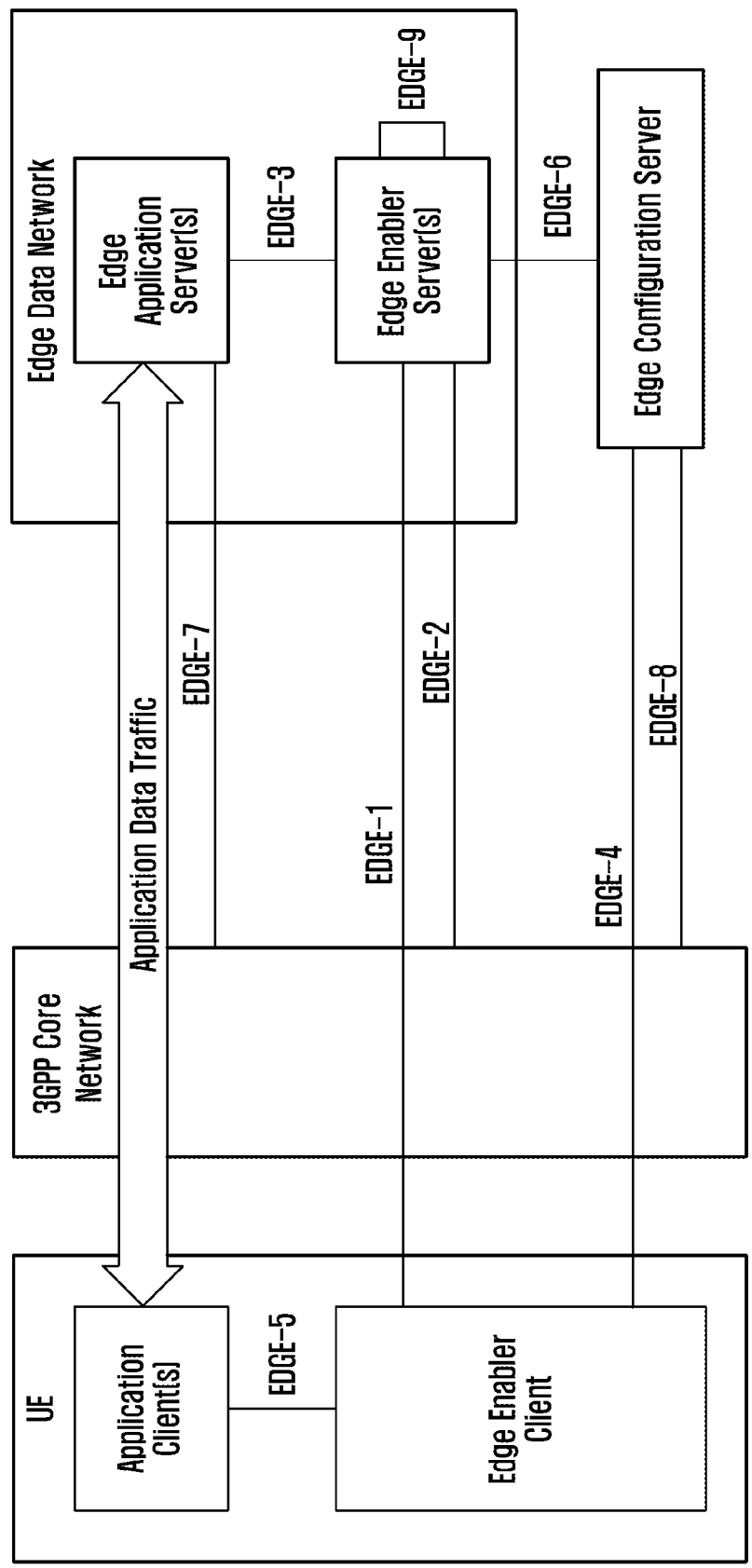
FIG. 1 illustrates an example of an edge computing application hierarchical structure according to an embodiment of the present disclosure.

FIG. 1 illustrates an example of an edge computing application hierarchical structure.

Descriptions of networks and edge computing entities illustrated in FIG. 1 are provided as follows.

Referring to FIG. 1, an edge computing system may include an edge enabler server (EES), an edge configuration server (ECS), an edge enabler client (EEC), an edge application server (EAS), and/or an application client.

An edge data network (EDN) may be a local data network, and an EAS(s) and an EES may be included in the EDN. An ECS may provide configurations related to the EES by including the detailed information of the EDN that hosts the EES. A user equipment (UE) may include an application client(s) and an EEC. The EAS(s), the EES, and the ECS may interact with a 3GPP core network. Hereinafter functional entities associated with an edge application hierarchical structure will be described in detail.

An EES establishes an edge hosting environment (or an edge computing platform), and may be aware of information associated with an EAS (EAS) operating in the edge hosting environment.

The EES may perform functions of negotiating with a UE and connecting an application client of the UE and the EAS in the edge hosting environment. A UE that supports the edge computing system may contain an EEC. A layer in which the EEC and an edge enabler mutually interoperate is referred to as an edge enabling layer. In the disclosure, the UE that contains the EEC to configure an edge enabling layer may be an IoT device, a vehicle, and the like, as well as a smartphone, and may be embodied in the forms of other various devices.

An ECS may be aware of deployment information of EESs, and may perform a function of transferring, to a UE (or an EEC), configuration information for using an edge computing service. The configuration information may include EDN connection information (e.g., a data network name, single network slice selection assistance information (S-NSSAI), and the like), an EDN service area (e.g., a cell list, a list of tracking area, a public land mobile network (PLMN) ID), EES connection information (e.g., uniform resource identifier (URI)), and the like. An EDN service area may be an EES-available area set by an EES. Based on the above, a UE may receive information associated with an EES accessible at a predetermined location. In the case that an ECS is capable of being aware of information associated with an EAS that is operating in an edge hosting environment of a predetermined EES, a UE may also be capable of obtaining the corresponding information via the EEC.

An EAS is a third party application server that operates in an edge computing system. The EAS operates in an infrastructure provided by an edge hosting environment and thus may provide an ultra-low latency service at a location close to a UE.

In a UE, an application client, an EEC that connects the application client and an edge computing service, and a mobile terminal (MT) that accesses a mobile communication system. An application of the UE is an application provided by a third party, and may be a client application program operating in the UE for a predetermined application service. In the UE, various application may be operable. At least one of the applications may use a multi-access edge computing (MEC) service. The EEC in the UE may be a client that performs intra-UE operations needed for an edge computing service. The EEC may determine which application is capable of using an edge computing service, and may perform an operation of connecting a network interface so as to transfer data of the application client of the UE to the EAS that provides the edge computing service. An operation of establishing a data connection in order to use an edge computing service may be performed via a mobile terminal in a 3GPP communication layer. The 3GPP communication layer may be a layer that performs a modem operation for using a mobile communication system, and may perform functions of establishing a wireless connection for data communication, registering a UE with the mobile communication system, establishing a connection for data transmission to the mobile communication system, and performing data transmission or reception.

Figure 2A:
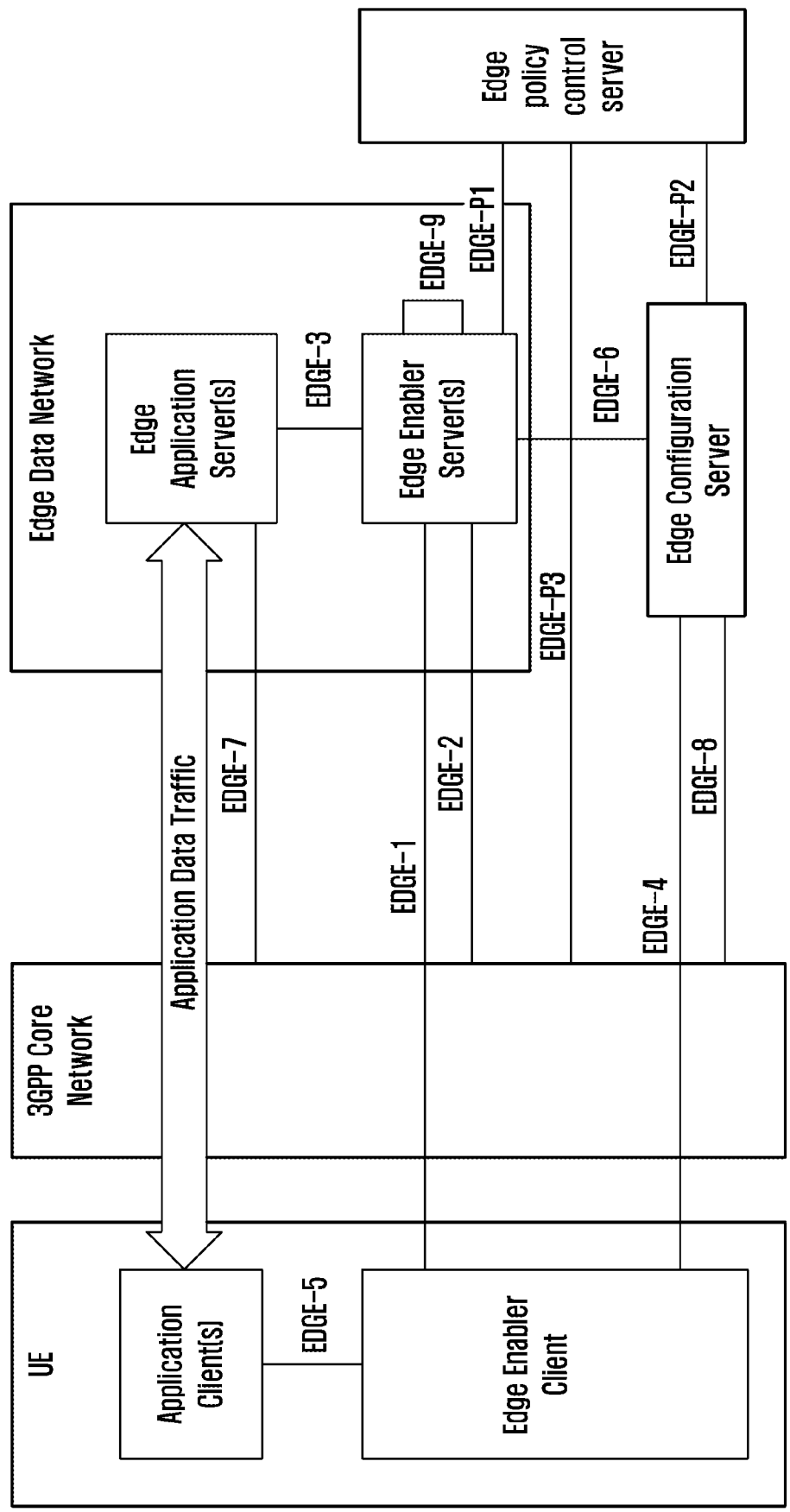
FIG. 2A illustrates an example of an edge computing application hierarchical structure including an edge computing service policy control function according to an embodiment of the present disclosure.
Figure 2B:
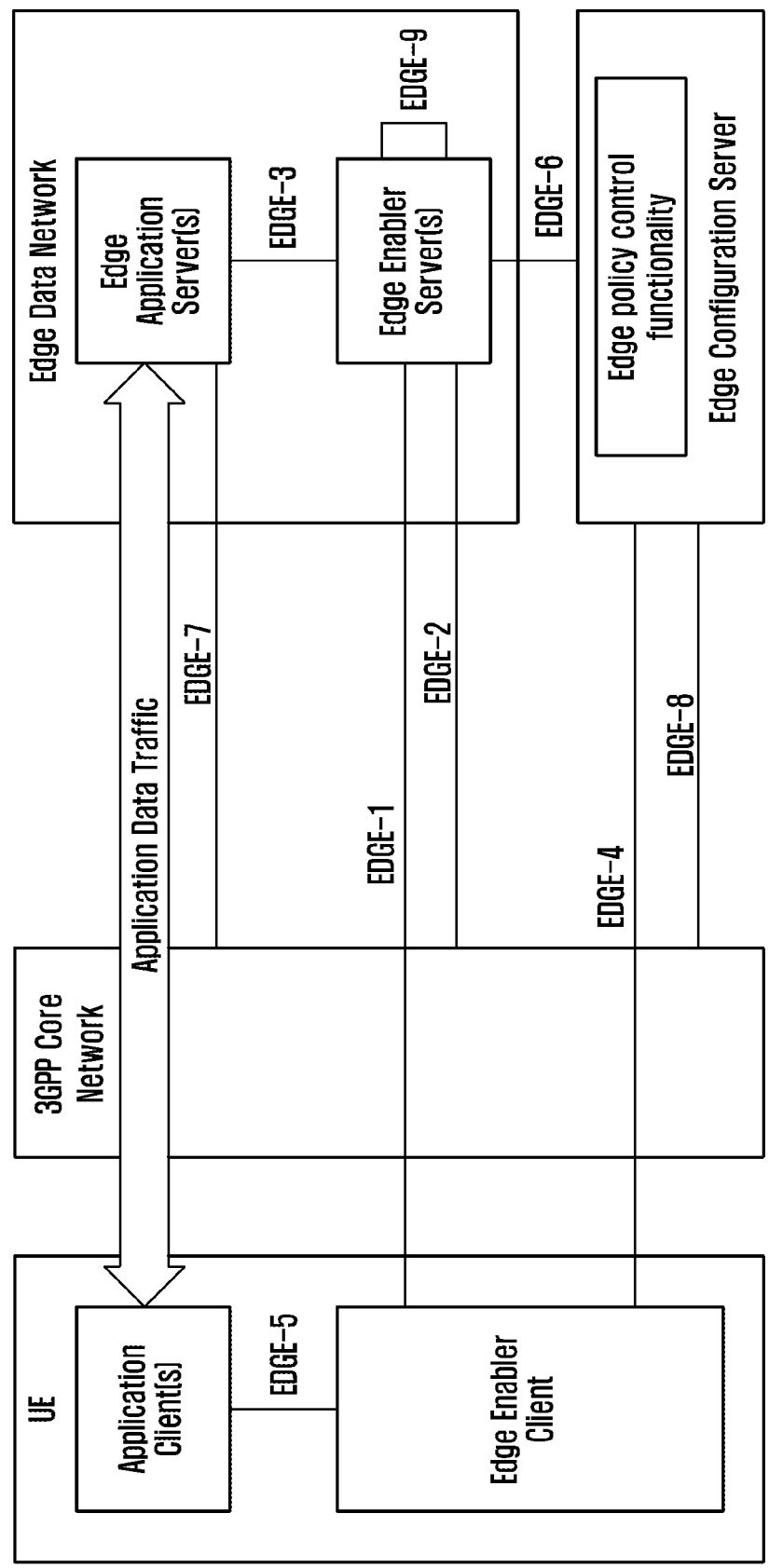
FIG. 2B illustrates another example of an edge computing application hierarchical structure including an edge computing service policy control function according to an embodiment of the present disclosure.

FIGS. 2A and 2B illustrate examples of an edge computing application hierarchical structure including a policy control function/server for an edge computing service according to an embodiment of the present disclosure.

In the disclosure, a policy control function for an edge computing service will be expressed as an edge policy control functionality (EPCF), and a policy control server for an edge computing service will be expressed as an edge policy control server (EPCS). However, the use of these terms does not limit the scope of the disclosure.

FIG. 2A illustrates a structure in which an EPCS is present as a separate device, and performs generation (creation), permission (authorization), and/or distribution (provisioning) of an edge computing service policy by interoperating with an existing ECS and EES.

FIG. 2B illustrates a structure in which an EPCS is not a separate device, and is embodied as one of the functionalities of an ECS so as to perform generation, authorization, and/or distribution of an edge computing service policy by interoperating with are EES.

Although FIG. 2B illustrates an example in which an EPCF is embodied as a functionality of an ECS, the EPCF may also be distributed and embodied in an EES. In other words, the EPCF may be distributed and embodied in an ECS and an EES.

Hereinafter, based on the structures described in FIGS. 2A and 2B, an EPCF or EPCS for an edge computing service will be provided. As described above, the corresponding function may be embodied as a separate server device as shown in FIG. 2A, or may be embodied as one of the functions of an existing ECS as shown in FIG. 2B.

The EPCF or EPCS may be managed and operated by a mobile communication network operator or an edge computing service provider (e.g., an edge computing-dedicated platform/infrastructure provider or an existing client service provider).

For example, an operator may determine an edge computing service policy control server/function that provides a detailed policy associated with an edge computing service operated in the network of the operator, and may provide the same to an edge computing server or UE (e.g., an edge enabler client in a UE). For example, whether to allow/support some functions of an edge computing service (e.g., whether to allow an app context relocation procedure, whether to allow performing an app relocation procedure based on prediction, or the like) may be provided as a policy, or the allowable range of quality (QoS) of an edge computing service may be provided. In order to determine, based on the state of a network operated, the policy associated with the edge computing service, an operator may take into consideration network state information or the like provided in a 3GPP network function.

As another example, in the case that an edge computing service policy control server/function is operated by an edge computing service provider, the edge computing service provider may determine an edge computing service policy in consideration of an edge computing hosting environment that is operated or edge computing infrastructure information (e.g., the capacity of a storage device capable of being used in real time in an edge computing hosting environment, the amount of use of an operation processor, or the like), and may provide the same to an edge computing server (e.g., an ECS, an EES, an EAS) or an edge enabler client in a UE.

Major operations of an EPCS or an EPCF are as follows:
receiving information required for determining a policy provided from an EEC, an EES, an EAS, or an ECS;
generating, allowing, and/or distributing an edge computing service-related policy based on the received information. In the disclosure, descriptions will be provided with reference to a policy related to a prediction-based app context relocation procedure (or planned/predicted service continuity supporting scheme; service continuity planning) among edge computing service related policies;
in order to determine an edge computing service-related policy, information associated with the state of resources in an edge hosting environment or a real-time network may be obtained from a 3GPP network function, a management and operation system, an edge computing management system, and the like, and in consideration the same, an edge computing service-related policy may be determined;
in the case that a request for configuring a predetermined policy is received from another device (e.g., an EEC, an EES, an ECS, or the like), permission of the requested policy may be performed and the permitted policy may be provided; and
a condition for updating a policy generated/allowed/distributed in advance may be determined, and update may be performed. For example, if it is expected that resources in an edge computing hosting environment are insufficient, detailed items associated with an existing policy may be adjusted and the adjusted policy may be distributed to an ECS, an EES, are EAS, an EEC, and the like.

FIG. 3 illustrates an example of an EAS request-based service continuity planning policy determining procedure according to an embodiment of the present disclosure.

In FIG. 3, descriptions may be provided by assuming that an EPCS is present as a separate device as illustrated in FIG. 2A. However, this is merely an example for ease of description and does not limit the technical scope of the disclosure.

In the description provided below, in the case that information associated with planned, predicted (projected), or expected (anticipated) behavior is available in an EES(s) or is provided by an EEC(s), "service continuity planning" may be an edge enabler layer value-added function (feature) that supports smooth service continuity.

In operation 301, an EAS may transmit a policy request message related to service continuity planning to an EES. For example, the policy request message may be included in an EAS registration request message that the EAS transmits, to the EES, in order to perform a registration procedure. For example, in the policy request message, an indicator requesting allowance for an application context relocation (ACR) procedure based on prediction of UE mobility, and/or an EAS supplier identifier, or the like may be included.

In operation 302, in the case that the EES receives the policy request message related to service continuity planning from the EAS, the EES may transmit an edge computing service policy generation/permission request message (e.g., policy authorization request) to an EPCS in order to obtain a policy related to service continuity planning associated with the corresponding EAS. In the corresponding message, at least one of an EAS identifier to which the corresponding policy is to be applied, an EAS provision service type, an EAS supplier identifier, a policy descriptor (e.g., information indicating a policy related to service continuity planning), and information associated with available resources of an edge hosting environment may be included.

The EPCS may produce a policy related to service continuity planning based on the information received from the EES, and may provide the same to the EES. For example, the EPCS may determine whether to allow service continuity planning (e.g., whether to allow starting of a UE mobility prediction-based app context relocation procedure) with respect to the EAS supplier identifier, the EAS identifier, and the EAS service type. For example, the EPCS may include, in the service continuity planning-related policy information, an indicator indicating whether to allow service continuity planning, an allowable range of a service area (e.g., a cell ID, a tracking area ID, a PLMN ID, a GPS-based physical location information, and the like), an allowed time range (e.g., information indicating that service continuity planning is allowed in only a predetermined time zone), an allowed UE subscriber level or allowed edge computing service subscription level (e.g., a mobile communication network service subscription level or subscription level information associated with an edge computing service.

For example, information indicating that service continuity planning is allowed only to a user who subscribes to a predetermined level or higher-level of a rate system in association with the mobile communication network service or an edge computing service), an available resource range of an edge hosting environment that allows a service continuity planning operation, and/or a temporary app context storage maintaining time (app context flush timer), and the like, and may transmit the same to the EES.

In operation 303, the EES may store service continuity planning-related policy information provided from the EPCS, and may transfer a production/authorization result of the corresponding policy and the policy information to the EAS. For example, the EES may include the service continuity planning-related policy information and/or the production/authorization result of the corresponding policy in an EAS registration response message, and may transmit the same to the EAS.

The EAS may perform an app context relocation related procedure based on the generated/authorized service continuity planning policy provided from the EES. For example, temporary app context information received from a source EAS may be stored during the temporary app context storage maintaining time included in the corresponding policy, and the temporary app context may be removed from a storage device when the corresponding time elapses.

In addition, in order to perform an operation according to the policy provided from the EPCS, the EES may request periodic provision of information from a 3GPP network and an edge computing management system (e.g., a device that manages instantiation associated with the EAS). For example, in the case that a policy-allowed range of a service area is included, the EES may request provision of UE position information from the 3GPP network in order to identify the location information associated with a UE that accesses. In addition, in the case that a spare resource range of an edge hosting environment that allows a service continuity planning operation is included in the policy information, for monitoring the state of spare resource of the edge hosting environment (e.g., a space that an edge application server is capable of storing app context information), an edge computing management system may be requested to perform periodic provision of related information.

In addition, the EES may receive an application context relocation request message from the EAS or the EEC, and in the case that a request type is explicitly specified in the corresponding message as a service continuity planning or prediction-based relocation request, the EES may select accepting or rejecting the application context relocation request message received from the EAS or EEC according to the service continuity planning-related policy obtained according to the embodiment of FIG. 3.

In operation 304, the EES may provide the service continuity planning policy information received from the EPCS to the ECS. For example, in order to report, to the ECS, that service continuity planning is to be applied to a predetermined EAS, the EES may include an EAS identifier and a service continuity planning allowance indicator in an EES registration update request message, and may transmit the same. In operation 305, the EES may provide the service continuity planning policy information provided from the EPCS to the EEC. Based on the service continuity planning policy provided from the EES, the EEC may determine whether to trigger a UE mobility prediction-based app context relocation procedure with respect to the predetermined EAS.

In the embodiment of FIG. 3, the service continuity planning policy information generated/authorized by the EPCS may be transferred, by the EES, to the EEC, EAS, and ECS. In the case that a movement of a UE is predicted based on the service continuity planning policy information received from the EES, the EEC may determine whether to trigger an app context relocation (ACR) procedure, and may determine the point in time at which an ACR execution request message is to be transmitted to the EES in order to trigger the ACR procedure. In addition, in the case that a service continuity planning policy that explicitly specifies allowance of a service continuity planning operation is received from the EES, the EEC may include information explicitly specifying that an operation type is service continuity planning when transmitting an application context relocation request message to the EES.

In addition, in the embodiment of FIG. 3, in the case that an operation associated with service continuity planning is allowed, the EES may request monitoring and provision of related information from a 3GPP network function (e.g., a network exposure function or a network data analytics function) in order to obtain UE moving route prediction information. For example, when the EES requests the UE moving route prediction information from the 3GPP network function, the EES may transmit, to the 3GPP network function, a monitoring/information provision request message including information associated with a policy-allowed range, time, and prediction accuracy included in the service continuity planning policy information. The point in time at which the EES transmits the request may be performed after procedure 2 of FIG. 3. Alternatively, the EES may transmit a request message to the 3GPP network function as described above after receiving a subscribe request message for subscribing to an application context relocation management event of the EAS.

Figure 4:
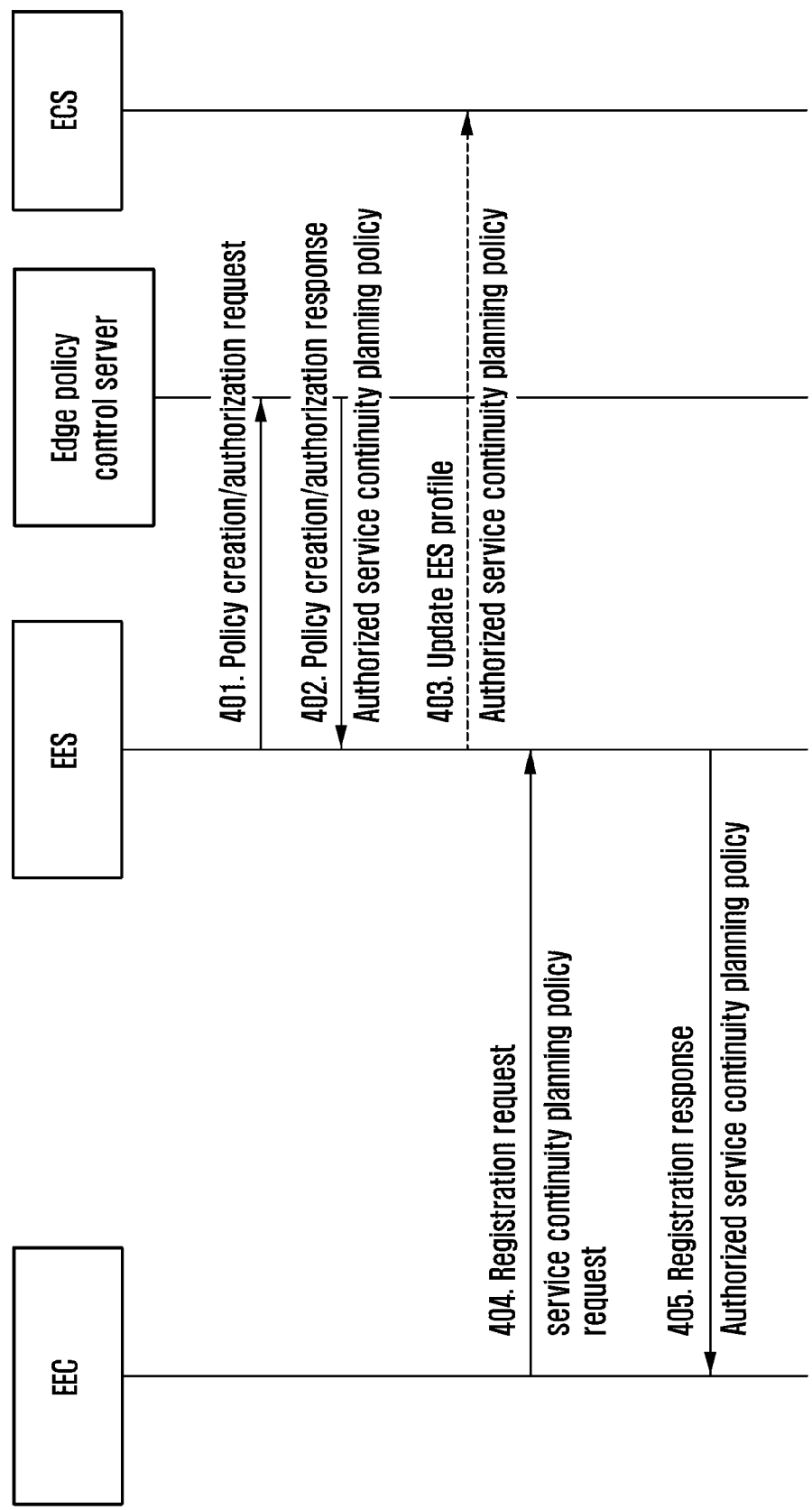
FIG. 4 illustrates an example of an EES request-based service continuity planning policy determining procedure according to an embodiment of the present disclosure.

FIG. 4 illustrates an example of an EES request-based service continuity planning policy determining procedure according to an embodiment of the present disclosure.

In FIG. 4, as illustrated in FIG. 2A, description may be provided by assuming that an EPCS is present as a separate device. However, this is merely an example for ease of description and does not limit the technical scope of the disclosure.

In operation 401, the EES may use a service continuity planning related policy provided as a local configuration, or may transmit, to the EPCS, a request for the corresponding policy. The corresponding request message may include at least one from among a service continuity planning policy request indicator, an EES identifier, an EES supplier identifier (e.g., an edge computing service supplier identifier), a registered EAS identifier list, information associated with a storage space and a processor capacity available for service continuity planning, EES service area or EDN service area information (policy-applied range information), a temporary app context storage maintaining time (app context flush timer), and a necessary prediction accuracy (or location QoS).

In operation 402, the EPCS may determine a service continuity planning policy based on information received from the EES. The corresponding policy information may include at least one among the pieces of information as follows:
- whether to allow service continuity planning;
- the corresponding policy-allowed range (e.g., a cell ID, a tracking area ID, a PLMN ID, GPS information, a latitude, a longitude, and the like), and an allowed time; or
- storage space and allowed processor capacity information for service continuity planning.

In operation 403, the EES may provide, to the ECS, information (e.g., whether to allow service continuity planning or the like) associated with a policy (e.g., an authorized service continuity planning policy) provided from the EPCS. For example, the EES may provide the corresponding policy information to the ECS via an EES registration update procedure.

The EES may transfer, to the EEC, the policy provided from the EPCS. For example, the EEC may transmit an EEC registration request message or an EAS discovery request to the EES in operation 404, and the EES may provide policy information associated with service continuity planning to the EEC in response thereto in operation 405. Alternatively, the EES may provide policy information associated with service continuity planning only when EEC service continuity support information (e.g., information associated with supporting, by an EEC, service continuity or prediction-based service continuity) is included in the EEC registration request message or EAS discovery request message. Alternatively, in the case that the EEC requests, from the EES, subscription to a notification service associated with an edge computing service policy information update, the EES may provide policy information associated with service continuity planning to the EEC via a notification message in order to report, to the EEC, information associated with a change of an edge computing service-related policy or a newly generated policy.

In the embodiment of FIG. 4, in the case that an operation associated with service continuity planning is allowed, the EES may request monitoring and provision of related information from a 3GPP network function (e.g., a network exposure function or a network data analytics function) in order to obtain UE moving route prediction information. For example, when the EES requests the UE moving route prediction information from the 3GPP network function, the EES may transmit, to the 3GPP network function, a monitoring/information provision request message including information associated with a policy-allowed range, time, and prediction accuracy included in the service continuity planning policy information. The EES may perform the operation after the procedure 402 of FIG. 4. Alternatively, the EES may transmit a request message to the 3GPP network function as described above after receiving a subscribe request message for subscribing to an application context relocation management event of the EAS.

Figure 5:
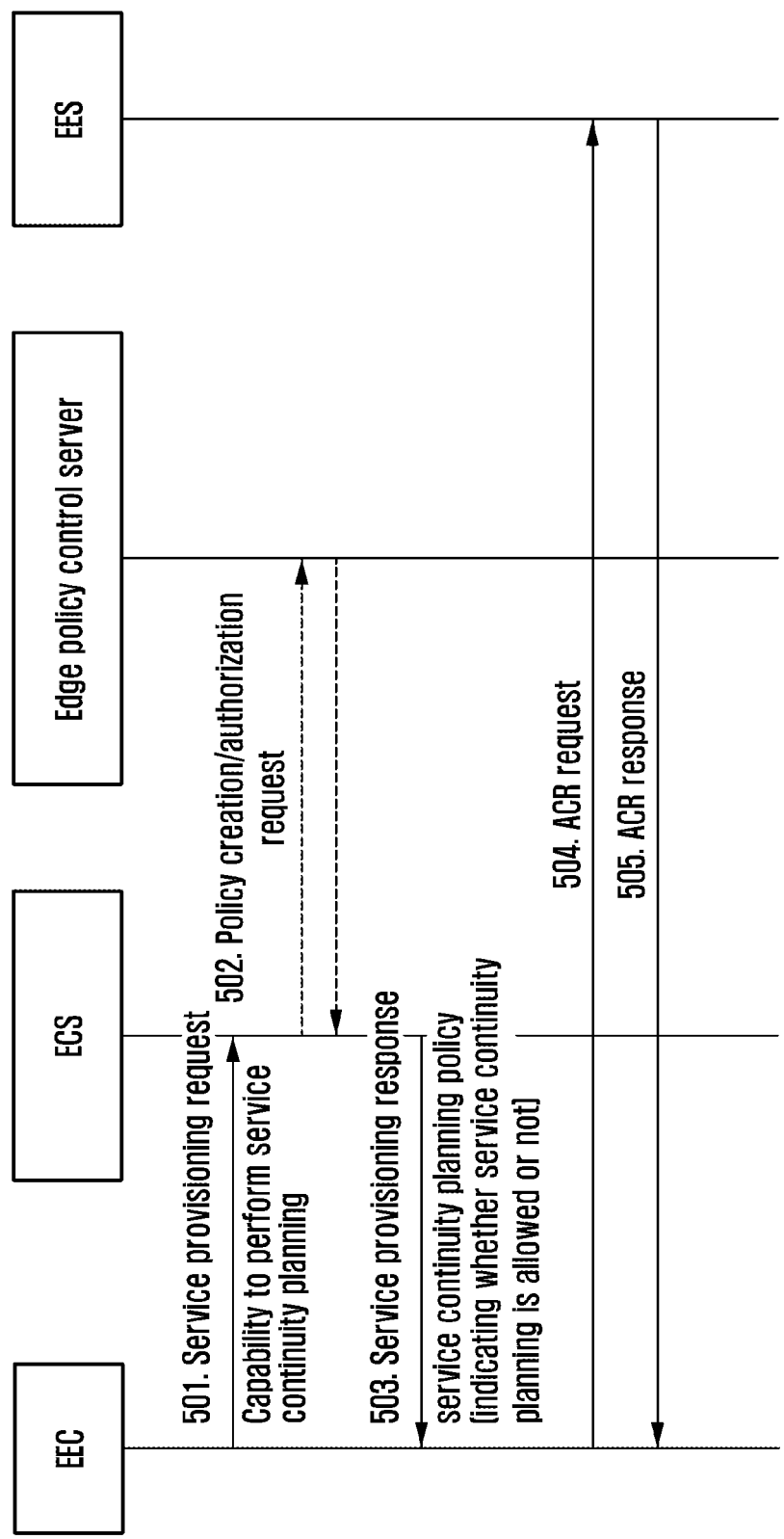
FIG. 5 illustrates an example of a method of configuring policy information in an EEC during a service provisioning procedure according to an embodiment of the present disclosure.

FIG. 5 illustrates an example of a method of configuring policy information in an EEC during a service provisioning procedure according to an embodiment of the present disclosure. FIG. 5 is merely an example to help understanding of the disclosure, and does not limit the technical scope of the disclosure.

In operation 501, an EEC may transmit a service provisioning request message to an ECS. The service provisioning request message may include information associated with whether service continuity planning is capable of being performed (or capability to perform UE mobility prediction, or capability to perform service continuity planning). In addition/alternatively, the service provisioning request message may include an allowance request indicator associated with a service continuity planning operation.

In operation 502, in the case that an EPCS is present in an edge computing system, the ECS may transmit, to the EPCS, a request for generation and authorization of a related policy in order to obtain a service continuity planning related policy to be configured in the EEC. The ECS may obtain service continuity planning policy information that has been described in the embodiment of FIG. 3 or the embodiment of FIG. 4 from the EPCS in response thereto.

If an EPCS is not separately present and an EPCF is embodied in the ECS as described in FIG. 2B, the ECS may autonomously generate and authorize the corresponding policy. In this instance, procedure 502 may be omitted. Alternatively, in the case that an EPCS is not separately present and an EPCF is embodied in an EES, the procedure 502 may be performed with respect to the EES. Alternatively, in the case that an EPCF is distributed and embodied in the EES and ECS, the EES and the ECS may cooperate to generate/authorize the corresponding policy.

In operation 503, the ECS may provide, to the EEC, the service continuity planning policy information generated/authorized in the previous operation. For example, the ECS may include the generated/authorized service continuity planning policy information in a service provisioning response message, and may provide the same to the EEC. For example, the generated/authorized service continuity planning policy information may include information associated with whether to allow service continuity planning.

In operation 504, in the case that the policy information (e.g., authorized service continuity policy), provided from the ECS in the previous operation, explicitly specifies that an service continuity planning operation is allowed, and the EEC performs application context relocation according to mobility of a UE for the purpose of service continuity planning, the EEC may clearly specify, in an application context relocation (ACR) request message, that the corresponding request type is a service continuity planning or prediction-based relocation request, and may transmit the ACR request message to the EES.

In operation 505, the EES may proceed with a procedure for application context relocation in response to the corresponding request from the EEC, and may provide a response message to the EEC.

Figure 6:
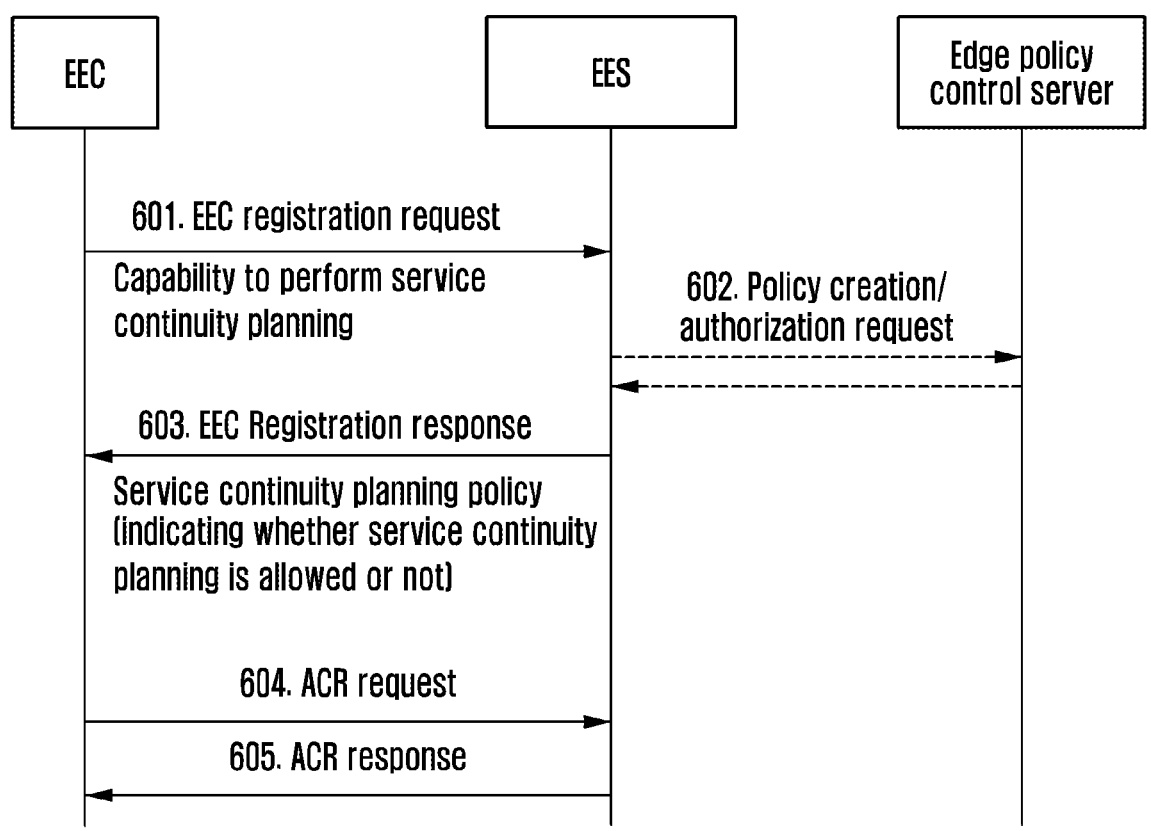
FIG. 6 illustrates an example of a method of configuring policy information in an EEC during an EEC registration procedure according to an embodiment of the present disclosure.

FIG. 6 illustrates an example of a method of configuring policy information in an EEC during an EEC registration procedure according to an embodiment of the present disclosure. FIG. 6 is merely an example to help understanding of the disclosure, and does not limit the technical scope of the disclosure.

In operation 601, an EEC may transmit an EEC registration request message to an EES. The EEC registration request message may include information associated with whether performing of service continuity planning is capable (or capability to perform UE mobility prediction, or capability to perform service continuity planning). Additionally/alternatively, the EEC may include an indicator to request permission for service continuity planning in the EEC registration request message and may transmit the same to the EES. Alternatively, in order to obtain information associated with whether service continuity planning is allowed with respect to a predetermined EAS, the EEC may also provide information associated with EAS filter information (e.g., an EAS identifier, an application client identifier, an EAS service type, or the like) to the EES.

In operation 602, in the case that an EPCS is separately present in an edge computing system, the EES may transmit a request for generation and authorization of a related policy to the EPCS in order to obtain a service continuity planning-related policy to be configured in the EEC. The EES may obtain service continuity planning policy information that has been described in the embodiment of FIG. 3 or the embodiment of FIG. 4 from the EPCS in response thereto. In the case that the EEC requests service continuity planning policy information associated with a predetermined EAS, the EES may request, to the EPCS, generation and authorization of a service continuity planning policy for each EAS.

In the case that an EPCS is not separately present, and an EPCF is implemented in the ECS as described in FIG. 2B, the EES may request, to the ECS, generation and authorization of the corresponding policy. In this instance, procedure 602 may be performed with respect to the ECS. Alternatively, in the case that an EPCS is not separately present, and an EPCF is implemented in the EES, the EES may not perform procedure 602 and may autonomously generate and authorize the corresponding policy. Alternatively, in the case that an EPCF is distributed and implemented in the EES and ECS, the EES and the ECS may cooperate to generate/authorize the corresponding policy.

In operation 603, the EES may provide, to the EEC, the service continuity planning policy information generated/authorized(allowed) in the previous operation. For example, the EES may include the corresponding information in an EEC registration response message and may provide the same to the EEC.

In operation 604, in the case that the policy information (e.g., authorized service continuity policy), provided from the EES in the previous operation, explicitly indicates that a service continuity planning operation is allowed, and the EEC performs application context relocation according to mobility of a UE for the purpose of service continuity planning, the EEC may clearly specify, in an application context relocation request message, that a corresponding request type is a service continuity planning or prediction-based relocation request, and may transmit the same to the EES (a source EES or a target EES).

In the case that the service continuity planning policy information is configured for each EAS in the previous operation, the EEC may request prediction-based application context relocation from only an EAS to which service continuity planning is allowed (i.e., it is explicitly specified, in the application context relocation request message, that the corresponding request type is a service continuity planning or prediction-based relocation request only for the allowed EAS, and the message is transferred to the EES).

In operation 605, the EES may proceed with a procedure for application context relocation in response to the corresponding request from the EEC or EAS, and may provide a response message to the EEC.

As described above, in the case that a policy including whether to allow service continuity planning is configured for the EES, the EES may perform the following operations according to the configured policy.

In the case that information indicating that the application context relocation request type is a service continuity planning or prediction-based relocation request is included in the application context relocation request message that the EES receives from the EEC or EAS, the EES may determine whether to allow the corresponding request according to the service continuity planning policy. For example, in the case that service continuity planning is allowed, an application context relocation procedure may be performed according to an existing procedure. In the case that service continuity planning is not allowed, the EES may transmit, to a device that transmits the request, a rejection message for rejecting the corresponding request.

In addition, the service continuity planning policy generated as described in the above described embodiments and configured in the EEC may be reviewed and corrected according to the following example conditions (service continuity planning policy evaluation triggers) and may be redistributed.

In one example. ECSP (edge computing service provider) domain is changed in the case that an EEC accesses an EDN or EES that belongs to another ECSP domain due to a movement of a UE or the like (i.e., in the case that the EEC accesses an EDN or an EES of another edge computing service supplier).

In addition, the service continuity planning policy generated as described in the above embodiments and configured in the EES or EAS may be reviewed and modified according to the following example conditions (service continuity planning policy evaluation triggers) and may be redistributed.

In one example, available EHE resource is changed out of resource to be reserved for ACR planning in the case that a storage device or processor resource available in an edge computing hosting environment (EHE) that hosts an EES or EAS is insufficient. For example, an EAS or EES may monitor, via an edge computing management system, state information associated with resources in an edge computing hosting environment.

In one example (predicted/expected), location QoS notification indicating that the requested location accuracy (prediction accuracy) can no longer be guaranteed for the UE hosting the EEC.

In such example, an EES or EAS may obtain information associated with a UE moving route from a 3GPP core network. In this instance, in the case that a notification indicating that accuracy of information associated with a moving route or location (location QoS) of a corresponding UE is no longer guaranteed is received from the 3GPP core network, correction of a service continuity planning policy may be performed.

For example, a service application programming interface (API) that an EPCS or EPCF provides may be defined as below:

API operation name: is defined as Eepcs_EdgePolicyCreate_Request, or Eecs_EdgePolicyCreate_Request, or Eees_EdgePolicyCreate_Request;

Input: an UE identifier, an EEC identifier, an EAS identifier, an EAS provision service type, an EAS supplier identifier, an EES supplier identifier, requested policy information or a descriptor (e.g., including information indicating a service continuity planning-related policy), available resource information of an edge hosting environment, information associated with an edge hosting environment resource usable in an EAS, and, and/or a temporary app context storage maintaining time (app context flush timer); and Output: authorized policy information [authorized policy: an applied EAS ID, an EES ID, an indicator indicating whether to allow requested service continuity planning, an allowed service area, an allowed time range, an allowed UE subscriber level or allowed edge computing service subscription level, a spare resource range of an edge hosting environment that allows a service continuity planning operation, a temporary app context storage maintaining time (app context flush timer), and/or a policy evaluation/update triggers].

As another example, a service application programming interface (API) that an EPCS or EPCF provides may be defined as below:

API operation name: is defined as Eepcs_EdgePolicySubscribe_Request, Eecs_EdgePolicySubscribe_Request, or Eees_EdgePolicySubscribe_Request;

Input: a UE identifier, an EEC identifier, an EAS identifier, an EAS supplier identifier, an EES supplier identifier (ECSP ID), requested policy information/descriptor (e.g., including information indicating a service continuity planning-related policy), and/or an event ID (e.g., EEC related policy information update, EAS related policy information update, EES or EDN policy information update); and Output: subscription ID, policy evaluation/update triggers.

Figure 7:
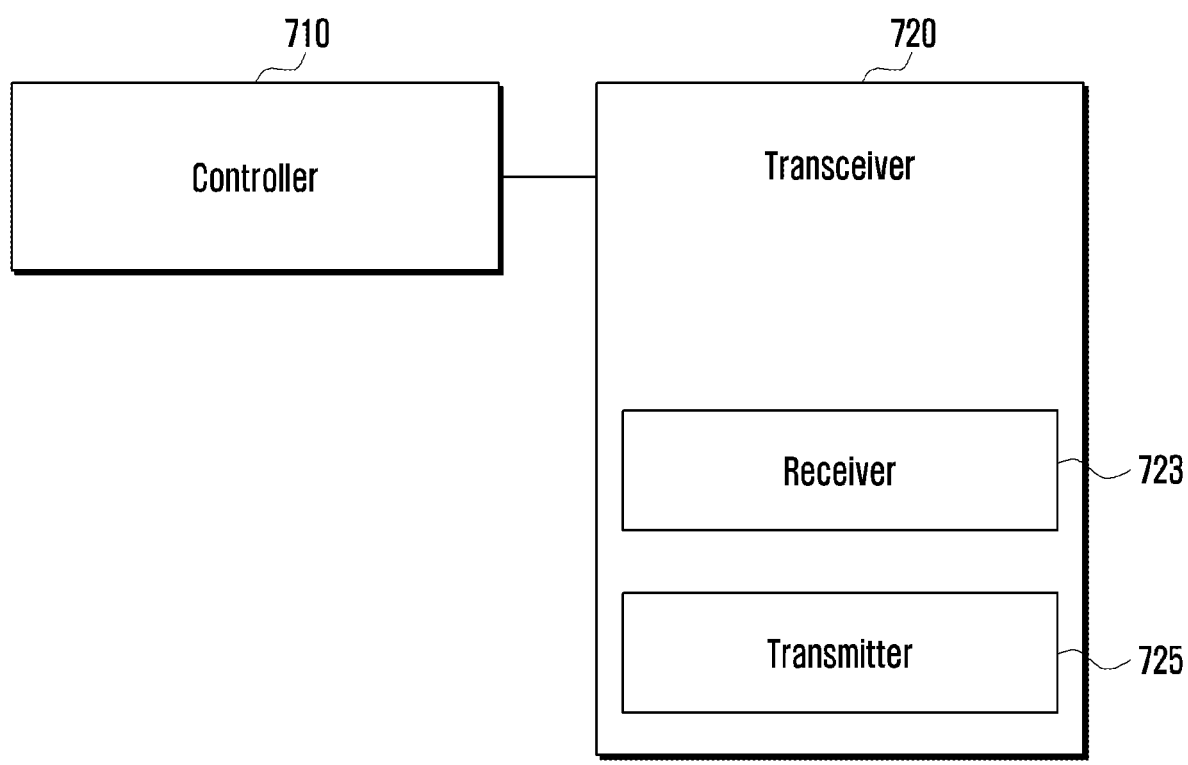
FIG. 7 illustrates a network entity and/or a terminal according to an embodiment of the present disclosure.

FIG. 7 illustrates a network entity and/or a terminal according to an embodiment of the present disclosure.

A UE that performs at least one function in an edge computing system may be implemented in various types of devices such as a vehicle, a smartphone, a smart watch, an IoT device, a local gateway, an infrastructure, and the like. The UE that performs at least one function in the edge computing system may perform an embodiment and/or method provided in the disclosure.

For example, referring to FIG. 7, a UE may include a transceiver 720, a controller (processor) 710, and/or a storage (memory) (not shown). However, the elements of the UE according to an embodiment are not limited to the above-described example. According to another embodiment, the UE may include more or fewer elements than the above-described elements. In addition, the transceiver, the controller, and the storage may be embodied as a single chip.

For example, the transceiver 720 may be embodied as a transmitter 725 and a receiver 723 according to another embodiment. The transceiver may perform transmission or reception of a signal with a 3GPP network function. The signal may include control information and data. In addition, the transceiver may receive a signal via a wireless channel and may output the same to the controller, and may transmit a signal output from the controller via a wireless channel.

For example, the controller may control a series of processes in which the UE operates according to the above-described embodiments of the disclosure. For example, the controller may perform a method of controlling a policy related to supporting continuity of an edge computing service according to an embodiment of the disclosure. The controller may include at least one processor. For example, the controller may include a communication processor (CP) that performs control for communication, and an application processor (AP) that controls a higher layer such as an application program or the like.

The storage may store information or data included in a signal obtained by the UE, and may have an area for storing data needed when the controller performs control and data produced when the controller performs control.

For example, a network entity may include at least one NF (e.g., a base station, EAS, EES, ECS, EPCS, etc.) that performs edge computing according to a system implementation.

Referring to FIG. 7, the network entity may include a transceiver 720, and a controller (processor) 710 which controls overall behaviors of the network entity. The transceiver 720 may include a transmitter 725 and a receiver 723.

The transceiver may perform transmission or reception of a signal with a terminal or other network entities.

The controller 710 may control a network entity or a terminal to perform any one of the above-described embodiments.

The controller 710 and the transceiver 720 are not necessarily implemented as separate modules, and may be implemented as a single component in the form of a single chip. The controller 710 and the transceiver 720 may be electrically connected. In an embodiment, the controller 710 may be a circuit, an application-specific circuit, or at least one processor.

Further, the operations of the network entity or the terminal may be realized by providing a memory device storing the corresponding program code in a component (e.g., the controller 710 and/or other components not shown) in the network entity or the terminal.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs software modules or software) may be stored in non-volatile memories including a random access memory (RAM) and a non-volatile memory including a flash memory, a read only memory (ROM), an electrically erasable programmable read only memory (EEPROM), a magnetic disc storage device, a CD-ROM, DVDs, other type optical storage devices, or a magnetic cassette. Alternatively, any combination of some or all of the memory devices may form a memory in which the program is stored. Further, a plurality of such memories may be included in the electronic device.

In addition, the programs may be stored in an attachable storage device which may access the electronic device through communication networks such as the Internet, Intranet, a local area network (LAN), a wide LAN (WLAN), and a storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, one embodiment of the disclosure may be partially combined with other embodiments to operate an entity and a terminal in an edge computing system. As an example, some part of the embodiments of FIGS. 3 to 6 in the disclosure may be combined with each other to operate an entity and a terminal in an edge computing system.

In the drawings in which methods of the disclosure are described, the order of the description does not always correspond to the order in which steps of each method are performed, and the order or relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first entity corresponding to an edge enabler client (EEC) in an edge computing system, the method comprising:
    transmitting, to a second entity corresponding to an edge enabler server (EES), a registration request message; and
    receiving, from the second entity, a registration response message,
    wherein the registration request message includes capability information to perform service continuity planning, and
    wherein the registration response message includes information on allowing the service continuity planning of the first entity.

2. The method of claim 1, wherein the capability information includes an indicator to request a permission for the service continuity planning of the first entity.

3. The method of claim 1, further comprising:
    transmitting, to the second entity, a request message for application context relocation; and
    receiving, from the second entity, a response message for the application context relocation,
    wherein, in case that the information included in the registration response message indicates that the service continuity planning is allowed, the request message includes information indicating that the application context relocation is for the service continuity planning.

4. The method of claim 1, wherein, in case that an edge computing service provider (ECSP) domain associated with the first entity is changed based on mobility of a user equipment (UE), a policy for the service continuity planning is modified.

5. A method performed by a second entity corresponding to an edge enabler server (EES) in an edge computing system, the method comprising:
    receiving, from a first entity corresponding to an edge enabler client (EEC), a registration request message, wherein the registration request message includes capability information to perform service continuity planning;
    determining whether to allow the service continuity planning of the first entity; and
    transmitting, to the first entity, a registration response message,
    wherein, in case that the second entity determines to allow the service continuity planning of the first entity, the registration response message includes information on allowing the service continuity planning of the first entity.

6. The method of claim 5, wherein the capability information includes an indicator to request a permission for the service continuity planning of the first entity.

7. The method of claim 5, further comprising:
    receiving, from the first entity, a request message for application context relocation;
    performing the application context relocation based on the request message; and
    transmitting, to the first entity, a response message for the application context relocation,
    wherein, in case that the information included in the registration response message indicates that the service continuity planning is allowed, the request message includes information indicating that the application context relocation is for the service continuity planning.

8. The method of claim 5, further comprising:
    obtaining a notification that quality of service (QoS) associated with location information of a user equipment (UE) is not guaranteed; and
    modifying a policy for the service continuity planning.

9. A first entity corresponding to an edge enabler client (EEC) in an edge computing system, the first entity comprising:
    a transceiver; and
    a controller configured to:

transmit, to a second entity corresponding to an edge enabler server (EES) via the transceiver, a registration request message, and receive, from the second entity via the transceiver, a registration response message, wherein the registration request message includes capability information to perform service continuity planning, and wherein the registration response message includes information on allowing the service continuity planning of the first entity.

10. The first entity of claim 9, wherein the capability information includes an indicator to request a permission for the service continuity planning of the first entity.

11. The first entity of claim 9, wherein the controller is further configured to:

transmit, to the second entity via the transceiver, a request message for application context relocation, and receive, from the second entity via the transceiver, a response message for the application context relocation, wherein, in case that the information included in the registration response message indicates that the service continuity planning is allowed, the request message includes information indicating that the application context relocation is for the service continuity planning.

12. The first entity of claim 9, wherein in case that an edge computing service provider (ECSP) domain associated with the first entity is changed based on mobility of a user equipment (UE), a policy for the service continuity planning is modified.

13. A second entity corresponding to an edge enabler server (EES) in an edge computing system, the second entity comprising:

a transceiver; and
a controller configured to:

receive, from a first entity corresponding to an edge enabler client (EEC) via the transceiver, a registration request message, wherein the registration request message includes capability information to perform service continuity planning, determine whether to allow the service continuity planning of the first entity, and transmit, to the first entity via the transceiver, a registration response message, wherein in case that the second entity determines to allow the service continuity planning of the first entity, the registration response message includes information on allowing the service continuity planning of the first entity.

14. The second entity of claim 13, wherein the controller is further configured to:

receive, from the first entity via the transceiver, a request message for application context relocation, perform the application context relocation based on the request message, and transmit, to the first entity via the transceiver, a response message for the application context relocation, wherein, in case that the information included in the registration response message indicates that the service continuity planning is allowed, the request message includes information indicating that the application context relocation is for the service continuity planning, and wherein the capability information includes an indicator to request permission for the service continuity planning of the first entity.

15. The second entity of claim 13, wherein the controller is further configured to:

obtain a notification that quality of service (QoS) associated with location information of a user equipment (UE) is not guaranteed; and modify a policy for the service continuity planning.

* * * * *

UNITED STATES PATENT AND TRADEMARK OFFICE
CERTIFICATE OF CORRECTION

| | | |
|---|---|---|
| PATENT NO. | : 12,375,950 B2 | Page 1 of 1 |
| APPLICATION NO. | : 18/053633 | |
| DATED | : July 29, 2025 | |
| INVENTOR(S) | : Kim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 451 days.

Signed and Sealed this
Sixteenth Day of December, 2025

John A. Squires
*Director of the United States Patent and Trademark Office*